United States Patent
West et al.

(10) Patent No.: US 11,367,954 B1
(45) Date of Patent: Jun. 21, 2022

(54) MULTIBEAM CROSS BAR ELECTRONICALLY SCANNED ARRAY

(71) Applicant: Rockwell Collins, Inc., Cedar Rapids, IA (US)

(72) Inventors: James B. West, Cedar Rapids, IA (US); Jiwon L. Moran, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 793 days.

(21) Appl. No.: 16/280,573

(22) Filed: Feb. 20, 2019

(51) Int. Cl.
| | | |
|---|---|---|
| *H01Q 3/38* | (2006.01) | |
| *H01Q 21/00* | (2006.01) | |
| *G01S 7/38* | (2006.01) | |
| *H01Q 3/26* | (2006.01) | |
| *H01Q 21/22* | (2006.01) | |

(52) U.S. Cl.
CPC .............. *H01Q 3/385* (2013.01); *G01S 7/38* (2013.01); *H01Q 3/2694* (2013.01); *H01Q 21/0025* (2013.01); *H01Q 21/22* (2013.01)

(58) Field of Classification Search
CPC .... H01Q 25/00; H01Q 3/385; H01Q 21/0025; H01Q 21/22; H01Q 3/242; H01Q 3/2694; H01Q 3/40; H01Q 5/25; H04B 7/0469
See application file for complete search history.

(56) References Cited

U.S. PATENT DOCUMENTS

| | | | |
|---|---|---|---|
| 8,903,342 B1 | 12/2014 | Wyse et al. | |
| 8,907,817 B1 | 12/2014 | Finley et al. | |
| 9,116,244 B1 | 8/2015 | West et al. | |
| 9,478,858 B1 | 10/2016 | West et al. | |
| 9,653,820 B1 | 5/2017 | West et al. | |
| 9,667,235 B1 | 5/2017 | Wyse et al. | |
| 9,735,469 B1 | 8/2017 | West et al. | |
| 2010/0079347 A1* | 4/2010 | Hayes ................ | H01Q 3/2682 343/705 |
| 2013/0050022 A1* | 2/2013 | Feger ................... | H01Q 21/24 342/368 |
| 2017/0054221 A1 | 2/2017 | West et al. | |
| 2017/0149144 A1* | 5/2017 | Gallagher .............. | H01Q 1/38 |
| 2017/0338558 A1 | 11/2017 | West | |
| 2018/0337724 A1* | 11/2018 | Ravishankar ...... | H04B 7/18515 |
| 2019/0013592 A1 | 1/2019 | West et al. | |
| 2019/0089064 A1* | 3/2019 | Zihir ................... | H01Q 21/062 |

OTHER PUBLICATIONS

U.S. Appl. No. 14/300,021, filed Jun. 9, 2014, West et al.

(Continued)

*Primary Examiner* — Khanh C Tran

(74) *Attorney, Agent, or Firm* — Suiter Swantz pc llo

(57) ABSTRACT

An antenna system and method includes or uses a set of M antenna structures and a cross bar beam former. The analog (or digital) cross bar beam former includes a set of M N to 1 (M(N×1)) interfaces, each of the M N to 1 interfaces having a first line coupled to a respective one of the set of the M antenna structures. The cross bar beam former also includes a set of N 1 to M (N(1×M)) interfaces, each of the N 1 to M interfaces having a set of M second lines, each of the M second lines being coupled to a respective one of the M N to 1 interfaces. Each of the N 1 to M interfaces includes a third line for a respective one of N independent beams.

20 Claims, 5 Drawing Sheets

(56) References Cited

OTHER PUBLICATIONS

U.S. Appl. No. 15/825,711, filed Nov. 29, 2017, West et al.
U.S. Appl. No. 15/970,781, filed May 3, 2018, West et al.
U.S. Appl. No. 15/972,608, filed May 7, 2018, West et al.
U.S. Appl. No. 16/021,784, filed Jun. 28, 2018, Paulsen et al.
U.S. Appl. No. 16/123,854, filed Sep. 6, 2018, West et al.
U.S. Appl. No. 16/147,252, filed Sep. 28, 2018, West, James B.

* cited by examiner

MULTIBEAM CROSS BAR ELECTRONICALLY SCANNED ARRAY

CROSS REFERENCE TO RELATED APPLICATIONS

The present application is related to U.S. patent application Ser. No. 16/123,854, filed Sep. 6, 2018, U.S. patent application Ser. No. 16/103,742, filed Aug. 14, 2018, U.S. patent application Ser. No. 15/972,608, filed May 7, 2018 and U.S. patent application Ser. No. 16/021,784, filed on Jun. 28, 2018. Each of the above listed applications is incorporated herein by reference in its entirety and assigned to the assignee of the present application.

BACKGROUND

Embodiments of inventive concepts disclosed herein relate generally to communication systems including but not limited to antenna systems for and methods of beam forming radio frequency signals.

Modern sensing and communication systems may utilize various types of antennas to provide a variety of functions, such as communication, radar, and sensing functions. For example, ultra-high frequency (UHF) and very high frequency (VHF) radio systems use directional and omnidirectional antenna arrays for data and voice communication. In another example, radar systems use antenna arrays to perform functions including but not limited to: precision navigation timing (PNT), sensing, intelligence gathering (e.g., signals intelligence, or SIGINT), direction finding (DF), electronic countermeasure (ECM) or electronic self-protection (ESP), electronic support (ES), electronic attack (EA), Intelligence, Surveillance, Reconnaissance (ISR) and the like. Various active electronically scanned array (AESA) applications utilize a particular polarization state, such as linear, circular, or elliptically polarizations for communicated or sensed radio frequency (RF) signals. Operation across a large band (ultra-wide band or ultra-ultra-wide band (UUWB)) using multiple independent beams is desirable in certain applications.

SUMMARY

In one aspect, embodiments of the inventive concepts disclosed herein are directed to an antenna system. The antenna system includes a set of M antenna structures and a cross bar beam former. The analog (or digital) cross bar beam former includes a set of M(N×1) or M (N to 1)interfaces, each of the M(N×1) interfaces having a first line coupled to a respective one of the set of the M antenna structures. The cross bar beam former also includes a set of N(1×M) interfaces, each of the N(1×M) interfaces having a set of M second lines, each of the M second lines being coupled to a respective one of the M(N×1) interfaces. Each of the N(1×M) interfaces includes a third line for a respective one of N independent beams.

In a further aspect, embodiments of the inventive concepts disclosed herein are directed to a communication, radar, or electronic warfare system. The communication system includes an array of antenna elements; and a cross bar beam former. The cross bar beam former includes a set of N to 1 interfaces and a set of 1 to M interfaces. Each of the N to 1 interfaces are coupled to a respective one of the antenna elements at a second line, where N is an integer greater than 3. Each of the first lines are coupled to a respective one of the N to 1 interfaces. Each of the 1 to M interfaces includes a third line for one of N independent beams, where M is an integer greater than 3.

In a further aspect, embodiments of the inventive concepts disclosed herein are directed to a communication, radar, or electronic warfare system. The communication system includes a transceiver, a set of 1 by L antenna structures arranged along a first axis, a cross bar former for the set 1 by L antenna structures comprising time delay units, a set of 1 by P antenna structures arranged along a second axis orthogonal to the first axis, and a second beam former comprising phase shifters for the set 1 by L antenna structures.

In some embodiments, the antenna structures are not rectilinear and can be a circular array of radial rings used with the cross bar beam former. The antenna structure can be three dimensional or conformal.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
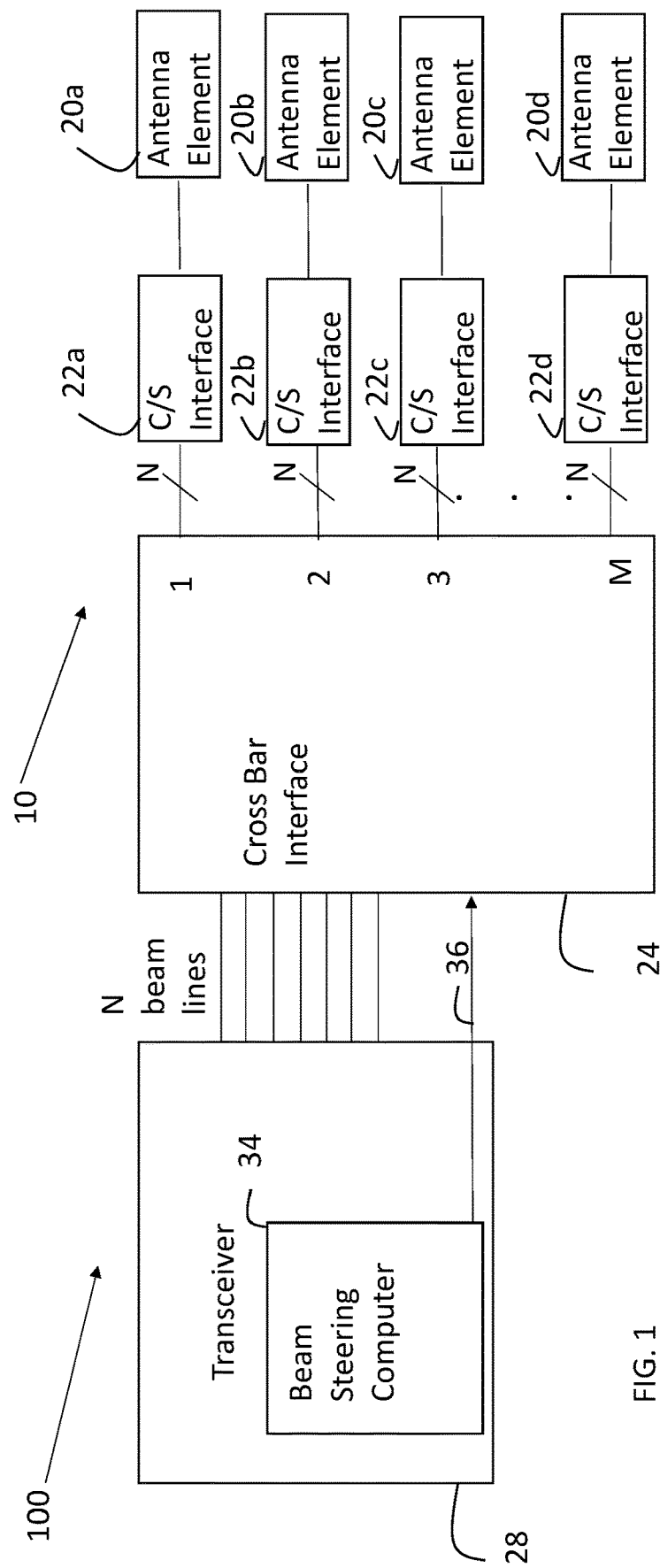
FIG. 1 is a schematic block diagram of an antenna system including a cross bar beam former for providing N independently steered beams in accordance with some embodiments of the inventive concepts disclosed herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the schematic diagrams, but should be construed in accordance with the language in the claims.

Some embodiments of the inventive concepts disclosed herein are directed to a beam former for an aperture (e.g., a UUWB Wavelength Scaled Array (WSA) active electronic scanning array (AESA) aperture) for use in the ultra-ultra-high frequency (UHF) to W Band. In some embodiments, systems and methods are directed to a UWB or higher bandwidth antenna which can provide multiple independent steerable beams at a low cost and with greater efficiency. Some embodiments of the inventive concepts disclosed herein are directed to a cross bar beam former. In some embodiments, the cross bar beam former provides N independent beams driving M antenna elements, where N is an integer and M is an integer. The multiple independent beams are enabled by unique cross connections and time delay (or phase shifter for narrow band systems) between input beam ports and radiating structures. The antenna elements or radiating structures can be single radiating elements, 1D subarrays or 2D subarrays disposed on a planar or conformal (e.g., curved substrate) in some embodiments.

The manufacturing techniques, devices and configurations described in U.S. patent application Ser. No. 15/970,781, filed May 3, 2018, U.S. patent application Ser. No. 16/021,784, filed Jun. 28, 2018, U.S. patent application Ser. No. 15/972,608, filed May 7, 2018, U.S. patent application Ser. No. 15/160,959, filed May 20, 2016, (dup—this has wrong filing date unless it is supposed to be a different app number, U.S. patent application Ser. No. 16/021,784, filed Jun. 28, 2108, U.S. patent application Ser. No. 16/147,252 filed Sep. 28, 2018 and U.S. patent application Ser. No. 16/123,854 filed Sep. 6, 2018, can be utilized in some embodiments; each of the above listed applications is incorporated herein by reference in its entirety and assigned to the assignee of the present application.

Referring now to FIG. 1, a communication, radar, or electronic warfare system or an antenna system 100 is configured to provide multiple independent steerable beams using a crossbar beam former 10. The system 100 includes the cross bar beam former 10, a set of antenna elements or structures 20 a-d, and a transceiver 28 in some embodiments. The cross bar beam former 10 is an analog beam former and includes a cross bar interface 24 and a set of combiner/splitter interfaces 22a-d in some embodiments. The transceiver 28 includes a beam steering computer 34. The antenna system 100 can be or can be part of a sensing system, radar system, and communication system.

In some embodiments, the antenna system 100 can be part of an electronic intelligence (ELINT) receiver, an electronic countermeasure (ECM) system, an electronic support measure (ESM) system, a radar system and/or hybrids thereof and achieves a 10:1 instantaneous band width. The antenna system 100 can be configured to provide multiple ultra wide band beams for jamming nulling on one or more beams, wide field of view coverage, independent modes for each beam, system level reconfigurability, track and hold modes, simulations spatial integration, simultaneous variable pulse repetition frequency (PRF) to optimize radar modality, and satellite communication connectability.

Each antenna structure 20a-d (which can include a polarization synthesis network) includes one or more antenna elements configured to receive or and transmit a radio frequency (RF) signal. Each antenna structure 20a-d can include two or more polarization elements in some embodiments. The set of the antenna structures 20a-d include M antenna elements, where each element is a single element, a two dimensional array, a linear array, or other set of antenna elements. M is an integer (e.g., 3, 4, 5, 8, 16, 64, 125, 184, 200, etc.). For some embodiments, M is an even number for the ease of manifold design complexity (or RF power split design complexity).

The antenna structures 20a-d can be metallic structures or circuit board structures. The antenna structures 20a-d are rectangular-shaped, linear, or bow-tie shaped conductive regions on circuit boards in some embodiments. Other shapes of antenna structures 20a-d can be utilized including but not limited to circular regions, pentagonal regions, hexagonal regions, square shaped regions, etc. The number of the antenna structures 20a-d can vary according to design criteria and system parameters. The antenna structures 20a-d can be arranged in a tightly coupled dipole arrays (TCDA) and can be slot antennas (e.g., metal cut-outs) or other structures. The number, size, polarization, shape, and arrangement of the antenna structures 20a-d can be provided for specific application criteria. In some embodiments, the array of antenna structures 20a-d is a large array including hundreds or thousands of antenna elements. The use of the cross bar beam former 10 reduces the large digital data pipe associated with conventional architectures in some embodiments. The cross bar beam former 10 also drastically reduces the RF feed manifold complexity because M parallel banks of P×Q RF manifolds, one for each of the M beams, are no longer needed in some embodiments.

Each of the antenna structures 20a-d is coupled to respective combiner/splitter interfaces 22a-d by a single communication line or line pair (e.g., coaxial conductor, circuit board conductor, differential conductive pair, etc.) in some embodiments. The set of the combiner/splitter interfaces 22a-d includes M combiner/splitter interfaces 22a-d in some embodiments. The combiner/splitter interfaces 22a-d each receive or provide N signals (e.g., one for each independently steered beam) from a respective N conductor bus from or to the cross bar interface 24 (depending on receive mode or transmit mode of operation). N is an integer (e.g., 4, 8, 16, etc.). In some embodiment, multiple communication lines are coupled to multiple elements of each antenna structure 20a-d. The cross bar interface 24 receives or provides N beam signals from or to the transceiver 28. Each of the N signals can be provided at a different frequency, different modulation/demodulation scheme, different polarity, different power level, etc. In some embodiments, the antenna structures are provided in a hierarchical architecture and interconnect structure as discussed in U.S. patent application Ser. No. 16/123,854, incorporated herein by reference in its entirety. In some embodiments, the interfaces 22a-d are cascaded.

The set of the combiner/splitter interfaces 22a-d operate as combiner/splitters in a transceiver mode, splitters in a receive mode, and combiners in the transmit mode in some embodiments. The antenna system 100 can be dedicated for the receive mode or the transmit mode with appropriate splitter only or combiner only elements.

The transceiver 28 is provided on one or more RF integrated circuits, or modules in some embodiments. The transceiver 28 is comprised of a block up/down converter, an analog-to-digital converter/digital-to-analog converter circuit, and a processor in some embodiments. The transceiver 28 can be a receiver only, transmitter only, or both a transmitter/receiver. The transceiver 28 can be embodied as a hard wired circuit, ASIC, programmable logic device, processor, combination thereof, or multiple transceivers (e.g., one for each independent beam). In some embodiments, multiple channel synthesizers can be utilized to remove settling times/transient phase noise in fast tuning transceiver systems. Generally, increasing the number of synthesizers or transceivers 28 decreases the tuning speed in some embodiments. The transceiver 28 is a local oscillator super heterodyne transceiver that can be tuned in synchronism with phase shifts of the beam former 10. The phase shifters of the beam former 10 can be kept one half a step ahead of the intermediate frequency instantaneous bandwidth to de-squint the pointing angle of the antenna system 100 as a function of frequency in some embodiments.

The beam steering computer 34 is a software module operating on a computer platform or processor, an ASIC, a programmable logic device, a hardware circuitry, or a mixture of thereof. The beam steering computer 34 provides beam steering control signals to the cross bar interface 24 via a control bus 36 in some embodiments In some embodiments, the set of phase or time delay commands are provided in response to a beam pointing angle parameter and a frequency parameter for each independent beam. In some embodiments, the set of phase or time delay commands are provided in response to a beam pointing angle parameter, an environmental parameter, and a frequency parameter. The beam steering computer 16 also selects the number of beams that may be activated by beam forming using the beam former 10. The beam steering computer 34 is provided within transceiver 15, antenna system 100 and/or as a discrete system. The beam former 10 includes components for time delaying or phase shifting the signals received by or provided to the antenna structures 20*a-d* and for providing polarization synthesis in response to the control signals on the control bus 36 in some embodiments. The antenna structures 20*a-d* can be any arbitrary collection of radiating elements and can be conformal while retaining RF impedance and time delay/phase shift and amplitude balance for the subcircuits within the cross bar beam former 10 that do not execute the adjustable time delay, phase shift or amplitude functions.

In some embodiments, the antenna system 100 can employ multi-chip modules discussed in U.S. application Ser. No. 13/760,964 filed Feb. 6, 2013, now U.S. Pat. No. 8,907,817, Ser. No. 13/781,449, filed Feb. 28, 2013, now U.S. Pat. No. 9,116,244 and Ser. No. 13/837,934 filed Mar. 15, 2013, now U.S. Pat. No. 9,478,858, all of which are incorporated herein by reference in their entireties. In some embodiments, the antenna system 10 can include components described in U.S. application Ser. No. 13/714,209 filed Dec. 13, 2012, now U.S. Pat. No. 9,667,235, and Ser. No. 13/737,777 filed Jan. 9, 2013, now U.S. Pat. No. 8,903,342, both incorporated herein by reference in their entireties. The phase shift or time delay commands can be provided by the beam steering computer 34 in accordance with the techniques described in U.S. application Ser. No. 14/300,021, filed Jun. 19, 2014 and incorporated herein by reference in its entirely. A lookup table, or algorithm can be used to calculate the amount of time delay or phase shift for each independently steered beam for implementing the time delay or phase shift at the beam former 10.

Figure 2:
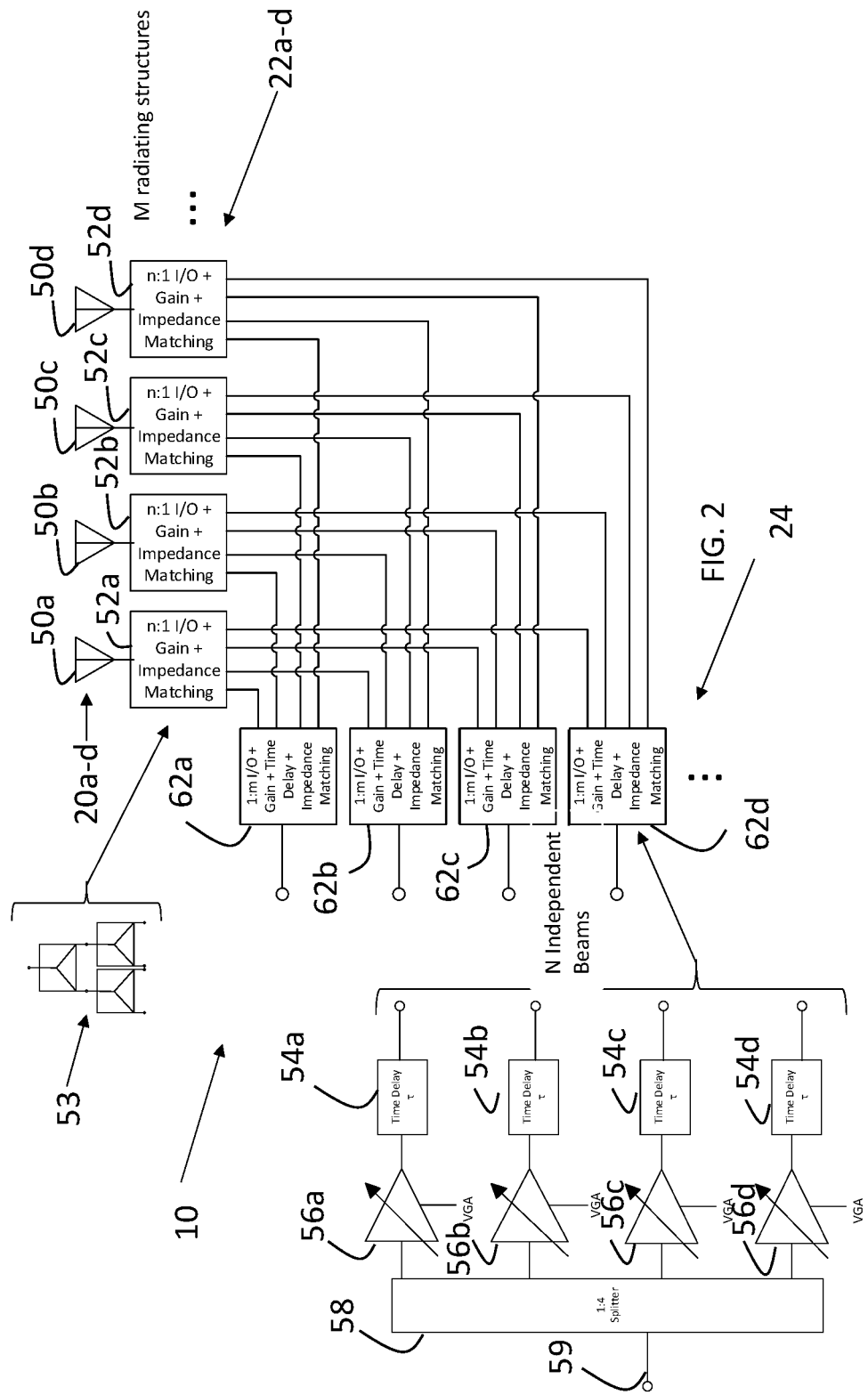
FIG. 2 is a more detailed block diagram of an exemplary cross bar beam former for the antenna system illustrated in FIG. 1 in accordance with some embodiments of the inventive concepts disclosed herein.

With reference to FIG. 2, the cross bar beam former 10 includes the cross bar interface 24 and the set of the combiner/splitter interfaces 22*a-d* and is coupled to the antenna structures 20*a-d* according to some embodiments. The cross bar beam former 10 creates M unique sets of differential phase shift across the output ports. This differential phase relationship across the ports is constant time delay or synchronized phase vs. frequency which prevents beam squint in some embodiments.

The cross bar beam former 10 is fundamentally analog in nature and utilizes time delay circuits, or synchronously tuned phase shift, and UWB sub circuits for UWB performance in some embodiments. The cross bar beam former 10 can include complex, parallel-type interconnections across the I/O beam ports and the radiating or antenna structures 20*a-d* in some embodiments. In some analog implementations of the cross bar beam former 10, analog circuits (time delay units, phase shifter units and amplifiers) within the beam former 10 are digitally controlled, but each of these circuits are analog in nature with discrete state settings in some embodiments.

In some embodiments, the beam former 10 is digital and uses direct digital beam forming to digitize at the antenna elements or structures 20*a-d* and then numerically beam forms via a digital signal processor (DSP). In some embodiments, the beam former 10 has a UWB cross bar beam former architecture that can be implemented digitally via a DSP, can exploit numerical beam forming techniques and can exploit digital time delay techniques.

The antenna structures 20*a-d* include antenna elements 50*a-d*. FIG. 2 is shown as a partial schematic drawing for simplicity, where the size of the array of the antenna structures 20*a-d* can include more components than those shown in FIG. 2. The number, size, shape and arrangement of the antenna elements 50*a-d* can vary according to design criteria and system parameters.

The cross bar interface 24 provides multiple independent beams enabled by unique cross connections and time delay between input beam ports and radiating structures (e.g., the antenna structures 20*a-d*). The cross bar interface 24 includes a set of splitter interfaces 62*a-d*. The N 1 to M or N(1×M) splitter interfaces 62*a-da* and the combiner/splitter interfaces 22*a-d* are described below for use in a transmit mode for simplicity. The combiner/splitter interfaces 22*a-d* can be configured for a receive mode by configuring the components in the path for the opposite direction (e.g., replace splitters for combiners and vice versa) in some embodiments. The architecture of the cross bar interface 24 can be operated in an UWB fashion by providing multiple differential time delays that are mapped between the I/O beam ports and the antennas structure ports in an UWB manner in some embodiments. The architecture is compatible for phase shifters that are synchronously tuned with the local oscillator of the synthesizer of a super heterodyne receiver of the transceiver 28 in some embodiments.

Each of the N 1 to M or N(1×M) splitter interfaces 62*a-d* include a 1 to M splitter 58, a set of M variable gain amplifiers 56*a-d*, and a set of M time delay units 54*a-d*. The beam steering computer 34 (FIG. 1) provides control signals to the variable gain amplifier 56*a-d* and the time delay units 54*a-d* to provide beam steering for each independent beam received at an input 59. The signal at the input 59 is split into M signals which are receive by the set of M variable amplifiers 56*a-d*. The variable gain amplifiers 56*a-d* selectively amplify respective signals and provide the signals to the respective time delay units 54-*d*. The time delay units 54*a-d* selectively time delay the signal in accordance with control signals received from the beam steering computer 34 (FIG. 1). The time delay units 54*a-d* provide the M time delayed signals for reception by the interfaces 22*a-d* embodied as N to 1 interfaces 52*a-d*. Each of the N 1 to M splitter interfaces 62*a-d* provides one signal to the M(N×1) interfaces 22*a-d*.

The N 1 to M interfaces 62*a-d* provide impedance matching in some embodiments. In some embodiments, the 1 to M splitter 58 is a passive splitter. In some embodiments, the 1 to M splitter 58 is an active splitter. The time delay units 54*a-d* have selectable integrated circuit paths for achieving time delays in some embodiments. The architecture can also be used in implementations of the cross bar beam former 10 as a hybrid (IF sampled) digital beam former in some embodiments.

In some embodiments, combiner/splitter interfaces 22*a-d* include respective M N to 1 interfaces 52*a-d*. The N to 1 interfaces 52*a-d* provide passive combining for communication of the signals for the N independently steered beams to the antenna elements 50*a-d*. In some embodiments, the N to 1 interfaces 52*a-d* each receive N signals, one signal from each of the set of N 1 to M interfaces 62*a-d* and combine the signals for receipt by a respective antenna element of the antenna elements 50*a-d*.

The N to 1 interfaces 52*a-d* provide gain and impedance matching in some embodiments. The combiner interfaces 52*a-d* each include a combiner networks 53 (e.g., three cascaded 2 to 1 combiners for a 4 to 1 combiner) in some embodiments. The combiner interface at antenna structures 20*a*-20*d* (e.g., the combiner network 53). Numerous splitter interface and combiner interface sub-circuit architectures are possible, both active and passive. In some embodiments, the antenna system 100 uses the cross beam former 10 to provide multiple beams in one dimension and uses other beam forming techniques in the orthogonal direction. For example, an array of column phased arrays can be disposed in elevation and stacked in a rack system to provide a two dimensional phased array. The row beam former is the cross bar beam former 10 to provide multiple beams in azimuth in some embodiments. A beam former (e.g., non-cross bar) can be used to steer the multiple beams in elevation in some embodiments. In some embodiments, the cross bar beam former 10 uses time delay units implemented in RF integrated circuits and the other beam former uses phase shifter based beam steering. In some embodiments, the elevation can be steered by the other beam former and the azimuth can be steered by the cross bar beam former 10. Synchronous tuning can be used for either elevation and azimuth.

Figure 3:
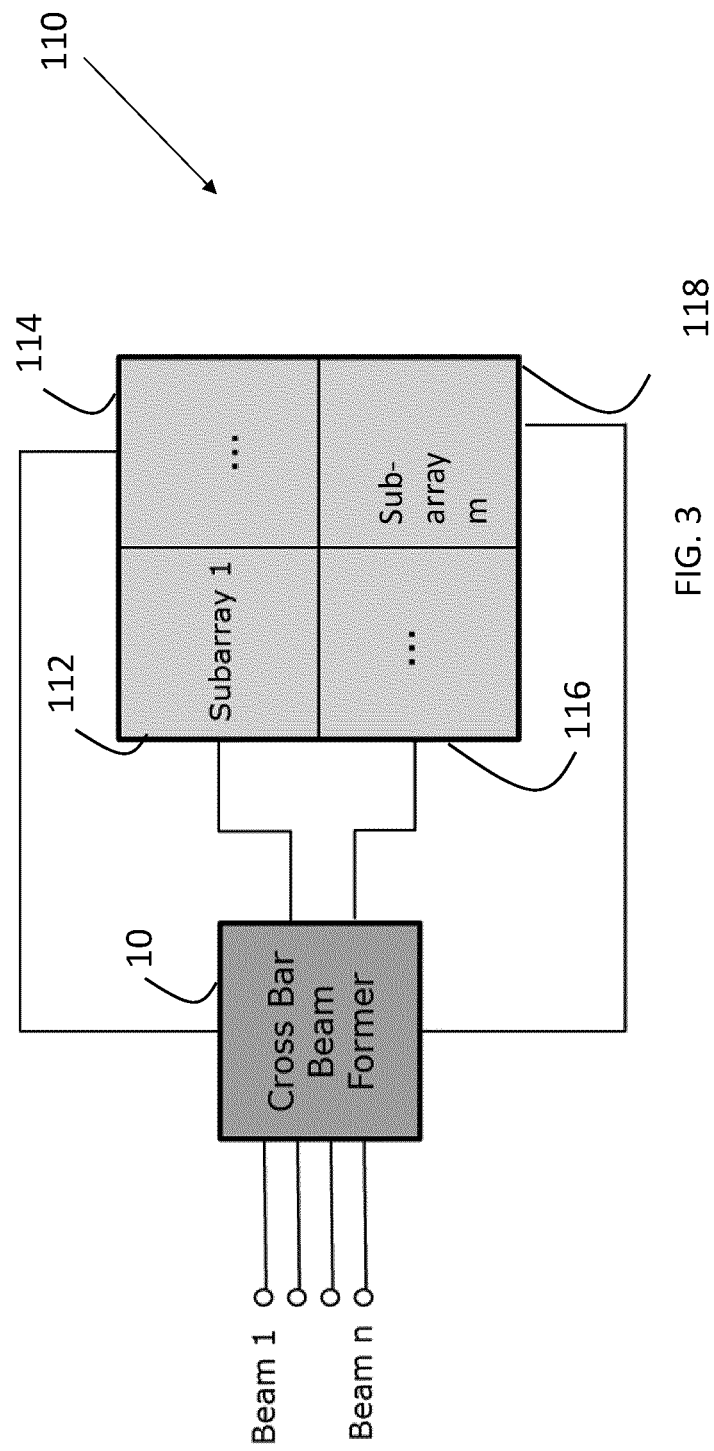
FIG. 3 is a block diagram of an exemplary cross bar beam former coupled to an antenna array for the antenna system illustrated in FIG. 1 in accordance with some embodiments of the inventive concepts disclosed herein.

With reference to FIG. 3, UWB time delay based cross bar beam former can be applied to subarrays, in addition to individual elements. The beam former 10 is configured as an analog cross bar beam former and couple to an antenna array 110. The antenna array 110 is coupled to sub arrays 112, 114, 116, and 118. The sub arrays 112, 114, 116, and 118 can be 1 by K linear arrays (e.g., vertically or horizontally oriented) or P by K two dimensional subarrays where K and P are an integer. Various numbers of subarrays and element counts can be utilized. In some embodiments, the subarrays 112, 114, 116, and 118 are conformally disposed on an aircraft surface in some embodiments.

The subarrays 112, 114, 116, and 118 can include phase shifter, synchronously tuned phase shifter or time delay based analog beam formers in some embodiments. The cross bar beam former 10 can utilize phase shifters, synchronously tuned phase shifters or time delay based topologies as described above in some embodiments. Any combination of phase shifter, synchronously tuned phase shifter or time delay analog beam former combinations can be arbitrarily distributed across the subarrays 112, 114, 116, and 118 (e.g., AESA) and the cross bar beam former 10. In some embodiments, the subarrays are hierarchically arranged with analog phase shifters on the first level and digital time delay units on subsequent levels. The composite radiation pattern of the AESA can be analytically expressed as a multiplicative array factor expression in some embodiments.

Figure 4:
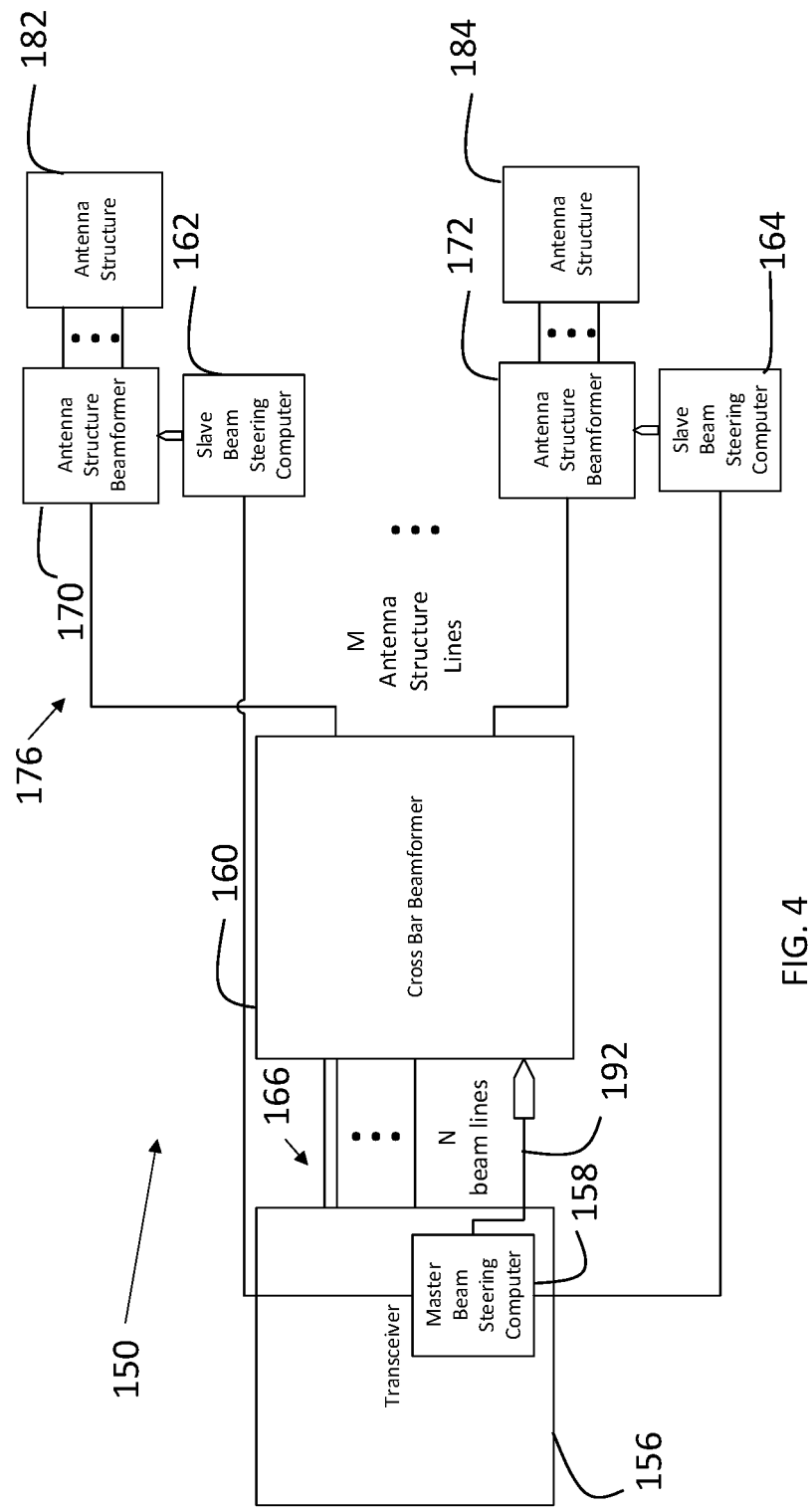
FIG. 4 is a schematic block diagram of an antenna system including a cross bar beam former for providing N independently steered beams and a pair of antenna structure beam formers in accordance with some embodiments of the inventive concepts disclosed herein.

Referring now to FIG. 4, a communication or antenna system 150 is configured to provide multiple independent steerable beams using a crossbar beam former 160 and antenna structure beam formers 170 and 172. The system 150 includes the cross bar beam former 160, the antenna structure beam formers 170 and 172, an antenna structure 182, an antenna structure 184, and a transceiver 156 in some embodiments.

The cross bar beam former 160 is similar to the cross bar beam former 10 (FIG. 1). The cross bar beam former 160 is an analog beam former or a digital beam former within a digital signal processor in some embodiments. The cross bar beam former 160 can include time delay or synchronized phase shifters.

The antenna structure beam formers 170 and 172 can be similar to the beam former 10 or can be a non-cross bar beam former. The transceiver 156 is similar to the transceiver 28 (FIG. 1) and includes a master beam steering computer 158 similar to the beam steering computer 34 (FIG. 1). Transceiver 156 is a single transceiver with parallel channels a set of parallel transceivers.

The master beam steering computer 158 is a single unit control for the entire system 150 or can drive slave beam steering computers 162 and 164 which provide control signals to the antenna structure beam formers 170 and 172. The master beam steering computer 158 provides control signals for beam steering N beams on lines 166 via a control bus 192.

The antenna structure beam formers 170 and 172 are analog or digital beam formers using time delay units or beam shifters in some embodiments. In some embodiments, a set of M antenna structure beam formers 170 and 172 are respectively associated with M antenna structures. The antenna structure beam formers 170 and 172 are cross bar beam formers configured to generate a two dimensional cross bar architecture which allows multiple beams in both azimuth and elevation planes. The antenna structure beam formers 170 and 172 drive the antenna structures 182 and 184 as commanded by the master beam steering computer 158 in some embodiments.

In some embodiments, the antenna system 150 can be part of an electronic intelligence (ELINT) receiver, an electronic countermeasure (ECM) system, an electronic support measure (ESM) system, a radar system and/or hybrids thereof and achieves a 10:1 instantaneous band width. The antenna system 150 can be configured to provide multiple ultra wide band beams for jamming nulling on one or more beams, wide field of view coverage, independent modes for each beam, system level reconfigurability, track and hold modes, simulations spatial integration, and simultaneous variable pulse repetition frequency (PRF) to optimize radar modality, and satellite communication connectability.

Each of the antenna structures 182 and 184 is a signal element or a subarray of p×q, p>1 and q>1 in some embodiments. The antenna structures 182 and 184 are linear, planar, rectangular, circular, one dimensional, two dimensional, three dimensional or conformal in some embodiments. The antenna structures 182 and 184 (which can include a polarization synthesis network) includes antenna elements configured to receive or and transmit a radio frequency (RF) signal on a printed circuit board.

Figure 5:
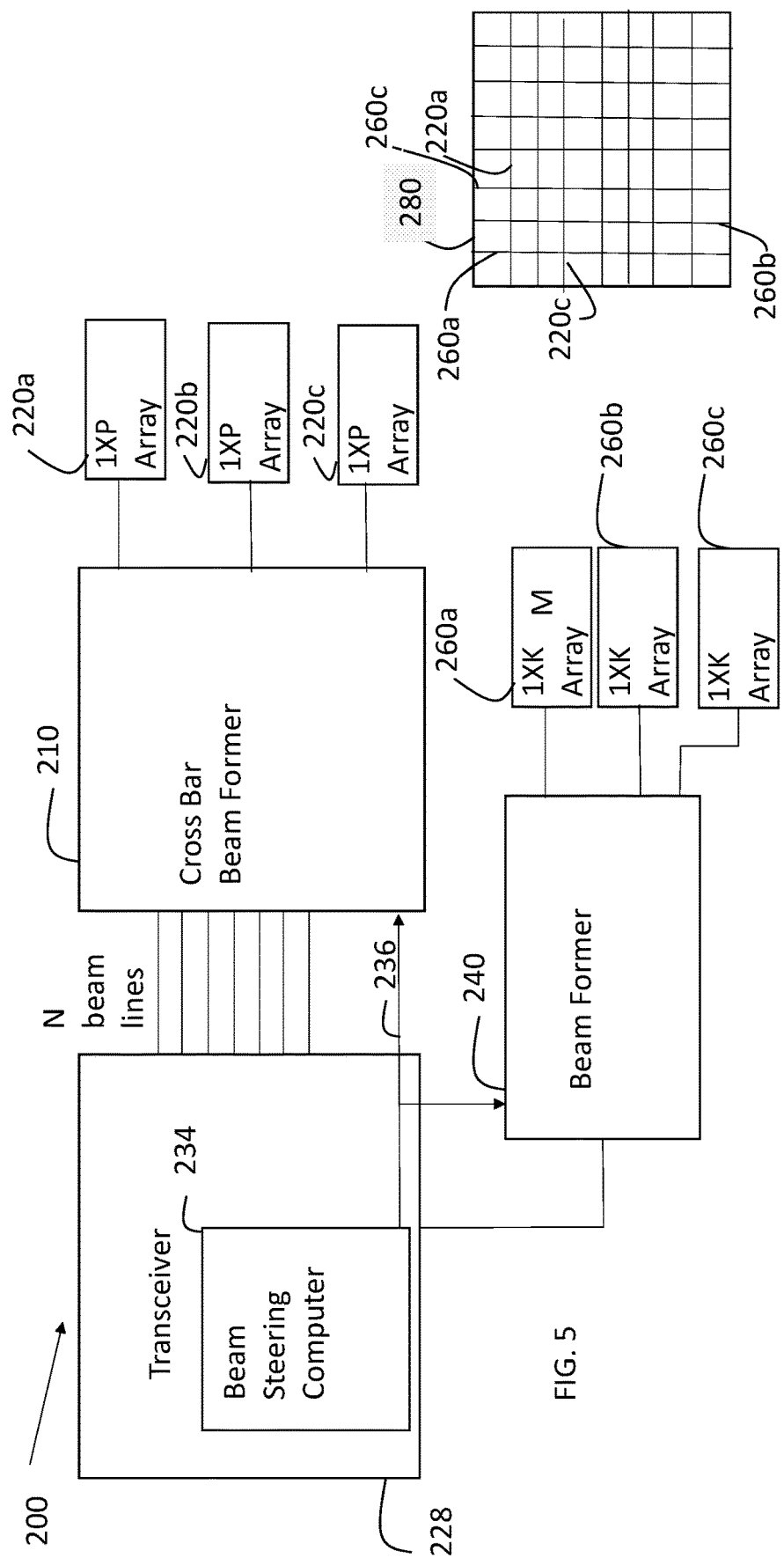
FIG. 5 is a schematic block diagram of an antenna system for two dimensional beam scanning of N beams using two linear arrays in accordance with some embodiments of the inventive concepts disclosed herein.

Referring now to FIG. 5, a communication or antenna system 200 is configured to provide multiple independent steerable beams using a crossbar beam former 210 and another beam former 240. The system 200 includes the cross bar beam former 210, the beam former 240, a set of 1×P arrays 220 *a-c*, a set of 1×K arrays 260*a-c* and a transceiver

228 in some embodiments. P and K are integers (e.g., 4, 5, 8, 16, 24, 28, 100, 164, etc). The antenna system 200 advantageously provides two dimensional beam scanning of all the beams by the pairing of vertical 1×P linear arrays 220*a-c* with a horizontal 1×K arrays 260*a-c* such that two fan beams intersect and together are processed as a pencil beam with narrow beam width in azimuth and elevation in some embodiments.

The cross bar beam former 210 is similar to the cross bar beam former 10 (FIG. 1) and can be a digital or analog beam former. The beam former 240 can be similar to the beam former 10 or can be a non-cross bar beam former. The transceiver 228 is similar to the transceiver 28 (FIG. 1) includes a beam steering computer 234 similar to the beam steering computer 34 (FIG. 1). The antenna system 200 can be or can be part of a sensing system, radar system, and communication system.

In some embodiments, the antenna system 200 can be part of an electronic intelligence (ELINT) receiver, an electronic countermeasure (ECM) system, an electronic support measure (ESM) system, a radar system and/or hybrids thereof and achieves a 10:1 instantaneous band width. The antenna system 200 can be configured to provide multiple ultra wide band beams for jamming nulling on one or more beams, wide field of view coverage, independent modes for each beam, system level reconfigurability, track and hold modes, simulations spatial integration, and simultaneous variable pulse repetition frequency (PRF) to optimize radar modality, and satellite communication connectability.

Each of the arrays 220*a-c* and 260*a-c* (which can include a polarization synthesis network) includes a linear array of antenna elements configured to receive or and transmit a radio frequency (RF) signal on a printed circuit board. The antenna arrays 220*a-c* and 260*a-c* can include metallic structures and are similar to the antenna structured 20*a-d* in some embodiments. The number of the arrays 220*a-c* and 260*a-c* can vary according to design criteria and system parameters. The arrays 220*a-c* can be arranged in an array 280 for azimuth scanning and the arrays 260*a-c* can be arranged in the array 280 for elevation scanning.

In some embodiments, the antenna system 200 uses the beam former 210 to provide multiple beams in one dimension and the beam former 240 to provide beams in the orthogonal direction. For example, the arrays 220*a-c* are column phased arrays and the arrays 260*a-c* are row phased arrays disposed in elevation and stacked in a rack system to provide a two dimensional phased array (e.g., the array 280). In some embodiments, the cross bar beam former 210 uses time delay units implemented in RF integrated circuits via a control bus 236 similar to the control bus 36 (FIG. 1) and the beam former 240 uses phase shifter based beam steering via the control bus 236. Synchronous tuning can be used for either elevation and azimuth.

Referring now to FIGS. 1-3, the antenna system 100 is configured to control signal polarization according to some embodiments. The system 100 can include a polarization control circuit in some embodiments. The beam steering computer 34 of the transceiver 28 can provide polarization control signals to the polarization control circuit in some embodiments. The polarization control circuit is located in the beam former 10 (e.g. in the interfaces 52*a-d* and 62*a-d*) or at the antenna structures 20*a-d* in some embodiments. The polarization control circuit can include variable can amplifiers and phase shifters.

Each of the components listed above may include at least one processor. The processors may include a microprocessor unit, an application-specific integrated circuit (ASIC), and a field-programmable gate array (FPGA), among others. The processors may also be a multi-core processor or an array of processors. The memory in each above mentioned device or component may include electronic, optical, magnetic, or any other storage device capable of relaying or providing the processor with program instructions. The memory may include, for example, include a floppy disk, CD-ROM, DVD, magnetic disk, memory chip, Static random access memory (SRAM), Burst SRAM or SynchBurst SRAM (BSRAM), Dynamic random access memory (DRAM), Ferroelectric RAM (FRAM), NAND Flash, NOR Flash, and Solid State Drives (SSD), among others, or any combination thereof. The program instructions may include code from any programing language, such as C, C++, C#, Java, JavaScript, Perl, HTML, XML, Python, Visual Basic, et cetera, or any combination thereof.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The inventive concepts disclosed herein contemplate methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:

1. An antenna system, comprising:
   a set of M antenna structures, where M is an integer greater than 3; and
   a cross bar beam former comprising:
      a set of M(N×1) interfaces, each of the M(N×1) interfaces having a first line coupled to a respective one of the set of the M antenna structures, where N is an integer greater than 3; and
      a set of N(1×M) interfaces, each of the N(1×M) interfaces having a set of M second lines, each of the M second lines being coupled to a respective one of the M(N×1) interfaces, wherein each of the N 1 to M interfaces includes a third line for one of N independent beams.

2. The antenna system of claim 1, further comprising a transceiver, a receiver or a transmitter having a set of N ports, wherein each of the N ports is coupled to the third line of a respective one of the M(N×1) interfaces.

3. The antenna system of claim 1, wherein the transceiver comprises a beam steering computer having a control bus comprising at least one conductor coupled to each of the N(1×M) interfaces.

4. The antenna system of claim 1, wherein each of the N(1×M) interfaces provides digitally controlled time delay and amplification for one of the N independent beams, wherein the transceiver comprises a beam steering computer having a control bus comprising at least M conductors coupled to each of the N(1×M) interfaces.

5. The antenna system of claim 3, wherein each of the N(1×M) interfaces provides digitally controlled time delay for one of the N independent beams.

6. The antenna system of claim 5, wherein each of the N(1×M) interfaces comprises a set of M variable gain amplifiers controlled via the control bus and a set of M time delay circuits controlled via the control bus.

7. The antenna system of claim 6, wherein each of the N(1×M) interfaces comprises a 1 to M splitter or a 1 to M combiner.

8. The antenna system of claim 1, further comprises a polarization synthesis network for each antenna structure.

9. The antenna system of claim 1, wherein each antenna structure comprises a linear array or two dimensional array disposed on a planar or conformal substrate.

10. The antenna system of claim 1, wherein each antenna structure comprises a first element and a second element configured as a non-orthogonal dipole pair, wherein a polarization synthesis network for each antenna structure is configured to provide an arbitrary polarization response for the non-orthogonal dipole pair.

11. A communication, radar, or electronic warfare system, comprising:
   an array of antenna elements; and
   a cross bar beam former comprising:
      a set of N to 1 interfaces, each of the N to 1 interfaces being coupled to a respective one of the antenna elements at a second line, where N is an integer greater than 3; and
      a set of 1 to M interfaces, each of the 1 to M interfaces having first lines, each of the first lines being coupled to a respective one of the N to 1 interfaces, wherein each of the 1 to M interfaces includes a third line for one of N independent beams, where M is an integer greater than 3.

12. The communication, radar, or electronic warfare system of claim 11, further comprising a transceiver, a receiver or a transmitter having a set of N ports, wherein each of the N ports is coupled to the third line of a respective one of the 1 to M interfaces.

13. The communication, radar, or electronic warfare system of claim 11, wherein the transceiver comprises a beam steering computer having a control bus comprising at least one conductor coupled to each of the 1 to M interfaces.

14. The communication, radar, or electronic warfare system of claim 11, wherein each of the 1 to M interfaces provides a distinct time delays for one of the N independent beams, wherein the transceiver comprises a beam steering computer having a control bus comprising at least M conductors coupled to each of the 1 to M interfaces.

15. The communication, radar, or electronic warfare system of claim 13, wherein each of the 1 to M interfaces provides digital beam steering for one of the N independent beams.

16. The communication, radar, or electronic warfare system of claim 15, wherein each of the 1 to M interfaces comprises a set of M variable gain amplifiers controlled via the control bus and a set of M time delay circuits controlled via the control bus.

17. The communication, radar, or electronic warfare system of claim 16, wherein each of the 1 to M interfaces comprises a 1 to M splitter or a 1 to M combiner.

18. The communication, radar, or electronic warfare system of claim 11, further comprises a polarization synthesis network for each antenna structure.

19. A communication, radar, or electronic warfare system, comprising:
   a transceiver;
   a set of 1 by L antenna structures arranged along a first axis, where L is an integer greater than 3;
   a cross bar beam former for the set 1 by L antenna structures comprising time delay units;
   a set of 1 by P antenna structures arranged along a second axis orthogonal to the first axis, where P is an integer greater than 3; and
   a second beam former comprising phase shifters for the set 1 by L antenna structures.

20. The communication, radar, or electronic warfare system of claim 19 wherein the time delay units are integrated circuit time delay units.

* * * * *